Jan. 22, 1957  R. K. BOYER  2,778,374
VALVE FOR SUPERSIZED TIRES
Filed May 13, 1953

INVENTOR.
RALPH K. BOYER
BY Hudson, Boughton,
Williams, David & Hoffmann
ATTORNEYS United States Patent Office 2,778,374
Patented Jan. 22, 1957

2,778,374

VALVE FOR SUPERSIZED TIRES

Ralph K. Boyer, Cleveland, Ohio, assignor to The Dill Manufacturing Company, Cleveland, Ohio, a corporation of Ohio Application May 13, 1953, Serial No. 354,685

3 Claims. (Cl. 137—223)

The present invention relates to a valve stem and valve arrangement for use in connection with inner tubes of that class of tires which may be designated as supersize tires and which are currently in use upon tractors, earth moving machines and perhaps other machines of similar import where these supersize tires are required.

In connection with the inflation by air or the filling of the tube with liquid, the time required for introducing the air at the desired pressure within the tube, or the introduction of liquid, is a matter requiring several hours and likewise the deflating of such tube or the exhaustion of the water therefrom, is likewise a matter requiring several hours and likewise the deflating of such a tube or the exhaustion of the water therefrom, is likewise a matter of a considerable period of time, and of course the time thus consumed is a matter of considerable importance in connection with machines employing such tires.

Furthermore, in connection with tires of this character as they are presently employed, a valve stem is connected with the inner tube of such tires and provided with a valve core or valve insides and may also be bent with a suitable bending tool to assume any angular position desired. When the before-mentioned assembly is secured to a tube the valve stem may be bent so as to extend toward the right or toward the outside of the tire as it is mounted and if the wheel and tire are used upon a given side of a vehicle, then under the conditions before described the wheel would not be susceptible of being mounted in another position on the vehicle even if replacement purposes required it because the direction of the valve would be in the wrong direction. This necessitates for off-the-road repair purposes spare tires which have valves not only bent to the left, but as well to the right side of the tire, or sometimes a valve of an entirely different length and bend.

Moreover, in some instances long extensions are required and provided with some sort of flexible pusher member so that when an air chuck is applied to the outside end of said extension the valve core or valve insides in the stem will be depressed so as to permit the entrance of air or liquid as the case may be. With this arrangement the replacement of a valve core or valve insides necessitates the removal of the wheel from the vehicle to get access to the attachment of the extension to the valve. Efforts have been made to overcome the above mentioned difficulties by placing the valve core or valve insides in the outer end of the extension. However, it has been found that leaks invariably develop in the joint which attaches the valve stem to the long extensions.

One of the purposes of the present invention is to obviate the objectionable features which have been recited and to provide a valve structure which will permit the tire and wheel assembly to be shifted from the right side to the left side inside dual to outside dual, or front to rear, without the complete disassembly of the unit to provide the tube with a suitable valve of proper length and bend to fit the desired position on the vehicle. This invention will permit the complete interchangeability of position of wheels on the vehicle and interchangeability of suitable extensions without the loss of air or liquid, as the case may be, during the transfer.

Another object is to provide a valve structure that will necessitate but one spare tire rather than a spare tire for each position on the vehicle. said spare being initially inflated to operating pressure with air or fluid, as the case may be.

Another object is to provide a valve structure which contains a floating type of valve and with an internal bore capacity which is of supersize and of much larger diametral width than could receive any known valve core or valve insides. This feature provides for much quicker inflation or deflation than obtainable with presently used equipment.

Additionally, it is the purpose to further provide a valve stem which provides a seal at the inner end of the valve structure so that when the valve stem is mounted upon a tube there will be no leakage around the skirt portions of the valve stem either of air or of a liquid even though the liquid may be carrying in solution a chemical composition.

A further object is to provide an extension member of bendable tubing, which extension is provided at one end for attachment to the valve stem and with provision for effecting an actual metal-to-metal sealing, and at the opposite end with provision for receiving either a standard valve insides, such as is presently used in automobiles, or a larger valve insides such as now commonly used with tires for earth mover vehicles, the valve insides being accessible at the outer end of the extension and thereby is in ready position to have applied thereto an air chuck for effecting inflation.

Referring to the drawings which form a part of this specification in which.

Figure 2:
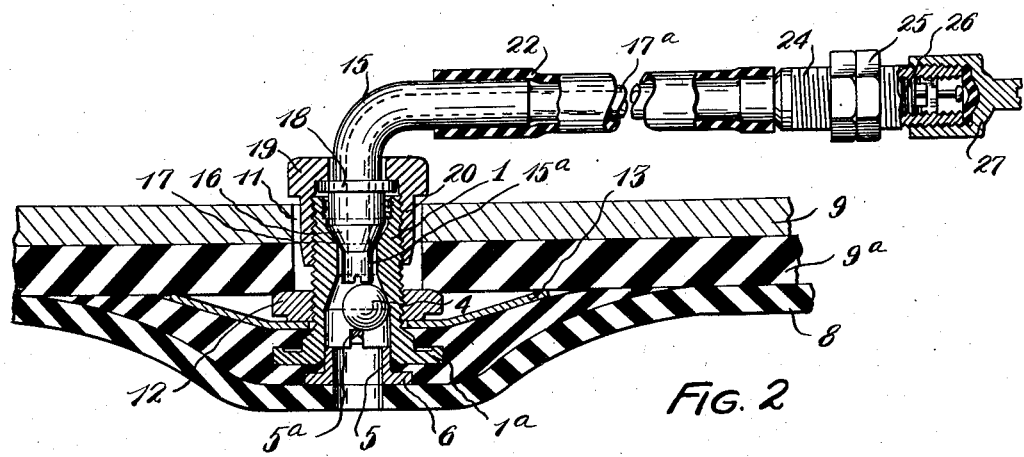
Fig. 2 is a sectional elevation of the valve stem and associated parts as applied to a tube and mounted upon a rim and supplied with an extension secured in sealed relation to the valve stem.
Figure 3:
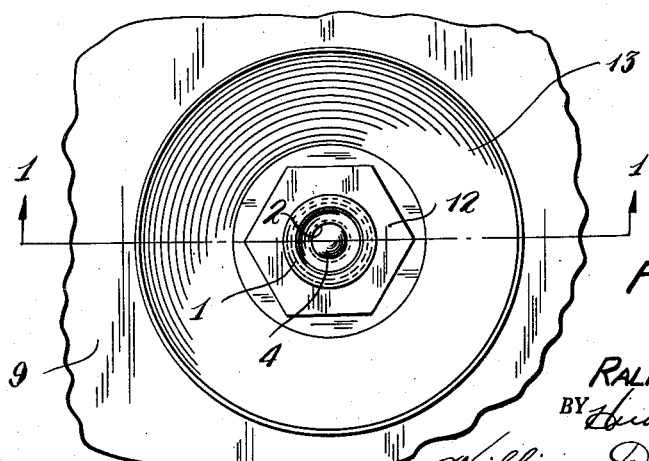
Fig. 3 is a top plan view of that which is shown in Fig. 1.

The valve stem comprises a body portion 1 which interiorly has a relatively large chamber provided intermediate its length with a restricted passage which is indicated at 2. Within the lower part of the chamber which is within the body portion 1 and below the restricted portion 2, is a check member presently shown as a ball valve 4 which when subjected to pressure of the fluid within the tube to which the valve stem is attached, will be forced to contact the lower end of the restriction 2 and form a seal when neither the valve cap 14, nor the extension shown in Fig. 2 is attached to the valve. While the valve 4 may be made of any suitable noncorrosive material it has been found that a valve made of Nylon is very satisfactory, particularly since Nylon is slightly compressible which contributes to the effective sealing action.

At the lower end of the body 1 is an outwardly extending flange 1a. Also associated with the lower end of the valve body 1 is a hollow thimble 5 which is provided with an outwardly extending flange 6. The thimble 5 is assembled with respect to the end of the body 1 and it will be noted that the flange 6 extends, to some extent, parallel with the flange 1a.

Rubber is vulcanized to the member 1 and then the member 5 is pressed into the lower end of body 1 so that the flange 6 of the member 5 mechanically compresses the rubber against the flange 1a. The member 5 to a certain extent telescopes within the end of the member 1 and in assembling the parts mentioned the rubber is forced into the space between the flanges 1a and 6 so that there is formed a perfect bond and fluid seal, with the rubber under compression between the flanges 6 and 1a.

Because of this construction there can be no leakage of air or liquid around the flange 6 and thence destroys the adhesion or bond of the body 1 to the rubber base seat, and the same statement is true with respect to fluid that may be used in the tube even if the fluid has dissolved therein some chemical substance, as is sometimes the case.

The member 5 is formed with a bridge 5a which is centrally located with respect to the member 5 and forms a barrier so that the Nylon valve 4 is restrained in its downward movement.

The body of rubber 7 in which the part 1 is molded may conveniently be in the form of a round body thicker at the center with feathered edges. This body of rubber is intended to be vulcanized to the inner tube of a tire with the opening in the member 5 in line with an appropriate opening in the tube.

Figure 1:
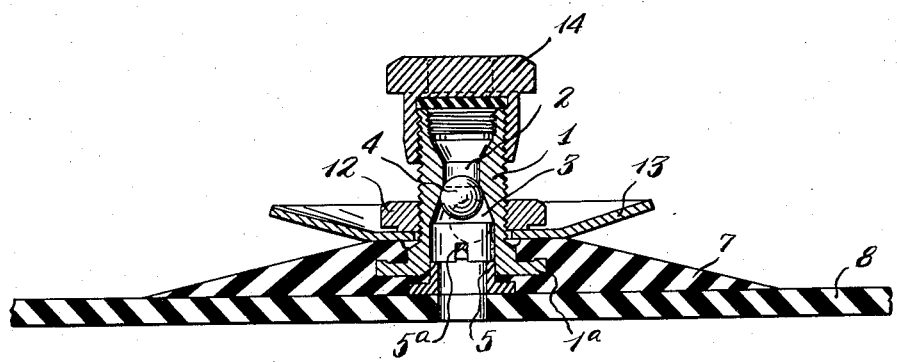
Fig. 1 is a sectional elevation showing the valve stem as it is applied to a tube of the kind to which reference has heretofore been made and showing a valve cap in position on the valve.

In Fig. 1 of the drawing there is shown, with portions omitted, an inner tube 8 to which is secured by vulcanization or otherwise, the rubber body 7 with its associated parts as have heretofore been described.

In Fig. 2 the valve structure secured to an inner tube is shown as mounted upon a rim 9. This rim is provided with an annular opening 11 through which the body of the valve structure extends. In the drawing there is shown as cooperating with the valve assembly, a spreader 13, the construction and purpose of which is well-known in the art. Threaded upon the outer surface of the body 1 of the valve stem, is a nut 12, which when threaded downwardly holds the spreader in its position and further compresses the rubber of the body 7 particularly with respect to the flange 1a.

Between the rim 9 and the tube 8 and the valve portions carried by the tube, there extends the usual flap 9a.

The outer end of the valve stem 1 is closed by means of a cap 14 which is threaded and adapted to be received upon the member 1 in order to close the interior of the body 1 against the entrance of dirt and other foreign material.

It will be appreciated that when the tube is inflated with air, the air pressure acting against the ball 3 will force the same into sealing position that is in contact with the walls of the throat or restricted portion 2 and under such condition even if cap 14 be removed there will be no leakage of air from the tube past the ball 3. This is a matter of considerable importance for reasons which will be subsequently explained.

A spare rim having an inner tube and casing associated therewith may be filled with air under pressure or it may be substantially filled with water which may or may not have a chemical substance therein which is well-known in the art and needs no further description. However, even in the case of the use of water with a chemical substance therein it will be seen that by virtue of the particular association of the body 1 with its lower flange and the member 5 with its flange 6, and the pinching of rubber between the same, which is effected during the assembly of the parts, there will be no leakage of such material around the flange 6 and destroy the bond between the rubber 7 and the body 1, thereby permitting the air or fluid as the case may be, to escape around the periphery of the body 1 and into the atmosphere.

Where water, either pure or with chemical content, is to be introduced into the inner tube, this may be done by removing the cap 14 and screwing the usual hose coupling upon the threaded exterior of the body 1.

However, where the tube is to be filled with air, which is commonly the case, provision is made for the combination with the valve stem. However, where the tube is to be filled with air which is commonly the case, air may be supplied through any suitable connection such as one having a larger valve than those commonly in use which valve may be carried by a hose attached to a conventional air compressor. It will be clear that the tube can be fully inflated since the sealing member 4 will be depressed during inflation and when the hose is detached the sealing member 4 will be moved into its closing position to prevent leakage, and after inflation the cap 14 may be installed, if the tire is to be used as a spare, but when otherwise used, it will be understood that suitable extensions will be attached to the valve after mounting upon the vehicle.

In Fig. 2 of the drawing there is illustrated an extension which is cooperatively used with the valve stem 1. This consists of a hollow angular member 15 which at one end is provided with a head portion 16 that is formed with a conical surface which is adapted to cooperate with the conical surface upon the interior wall of the member 1 and which is indicated at 17. The angle of the conical portion 16 is slightly less than the angle of the tapered portion or wall 17 so that when the two slanting wall portions just mentioned are moved or forced into engagement the contact between them is essentially a circular line contact, thus providing a sealing contact.

The angular member 15 is provided with a flange 18 which is adapted to be engaged within a recess formed in an annular member 19 which member 19 has a skirt portion 20 which is threaded so that it may be screwed upon the valve stem 1. For the purpose of assembly the head of the member 19 may be formed with sides which are adapted to receive a wrench.

The end of the angular member 15 opposite to that which has been described is connected with a tube of desired length which is indicated at 17a, the tube being covered with a suitable covering 22 which may be of plastic nature.

At the outer end of the tube there is an exteriorly threaded body portion 24 with which may be associated retaining nuts 25 for positioning and holding the tube at its outer portion, with respect to a fixed part of the wheel with which the constructions heretofore described are associated.

The outer portion of this member 24 is interiorly threaded and adapted to receive a valve core or valve insides 26 which is of standard construction and may be of the type used in automobiles or the type presently used in earth moving equipment that is of supersize which are intended to be used primarily in connection with inflation devices for the supersized tires of the type which have been earlier mentioned in this specification. The outer end of the member 24 may be closed by means of a valve stem cap 27 of construction which is commonly used in the art.

When the inner end of the angular member 15 of the extension is secured in and to the valve stem 1 as has heretofore been described, the valve 4 is pushed downwardly by means of an extension 15a so that the ball valve can not function as a valve, and as will be obvious the bridge member 5a limits the downward movement of the valve. The extension just described is usually used only to inflate or deflate the tire or to vary the operating pressure.

It will be seen that the nature of the assembly of the inner end of the member 15 with respect to the valve stem 1 is of such a nature that prior to final position by screwing home the member 20, the angular member 15 and its extension may be rotated to occupy any angle position which is desired.

This forms an important departure from what is generally present practice where an extension is mounted upon a tire and a tube and spare rim. Where a tire is changed from an inside dual to an outside dual or from either of the aforementioned positions of the front wheel, will create the valve problem as we have heretofore referred to.

In using the device which has heretofore been described, spare tires are provided with the described valve stem and with the valve stem capped by the cap 14 as indicated in Fig. 1. The spare tire thus provided is adapted for use upon either side of the vehicle and when the extension which is heretofore described and as shown in Fig. 2 is used, it may be angularly adjusted to extend outwardly from the tire and thus serve for a spare which can be used upon either side of the vehicle.

When a spare is provided equipped with the valve stem 1 and cap 14 which is shown in Fig. 1 of the drawing, it will be inflated at least to some degree and when it is desired to apply to the stem an extension of the type and kind which is shown in Fig. 2 of the drawing, the cap 14 may be removed but no air will be lost from the inner tube because of the presence of the valve 4 which will seat itself and prevent the escape of air as will be clearly understood by reference to Fig. 1. When the extension is assembled with respect to the valve stem 1 in the manner heretofore described and as shown in Fig. 2, the valve 4 is moved to inoperative position thus providing unrestricted communication between the interior of the inner tube and the tubular extension, and the valve core or valve insides 26 assembled at the outer end of the tubular extension controls either the addition of air to the interior of the inner tube or where necessary, the exit of air by depressing the valve pin of the valve insides.

Having thus described the invention, I claim:

1. In combination a valve stem adapted to be used with a supersized inner tube, said valve stem having an inner chamber extending therethrough and having a restricted portion intermediate its ends, a freely moving ball within the lower end of the aforesaid chamber and adapted to cooperate with the restricted portion just mentioned to form a sealing contact therewith, an elbow-shaped tubular member having its inner end portion extending within the chamber of the valve stem which portion is adapted for engagement with a portion of the inner wall of said chamber to effect a sealing relation, said tubular member having an extension for engagement with the ball to displace the same when the said tubular member is in cooperation with the valve stem, a collar carried by said tubular member, a cap having a central opening through which said tubular member extends, the said cap being hollow and being adapted to engage the said collar, the said cap having screw thread engagement with the outer surface of said valve stem whereby to force the inner end of said tubular member into its contact with the inner wall of the valve stem chamber, the said elbow-shaped tubular member being adjustable angularly with respect to the valve stem upon loosening of the cap which retains the elbow and valve stem in engagement, a conduit secured to the outer end of the elbow-shaped tubular member, said conduit being adapted to receive a valve insides.

2. The combination of a valve stem adapted for use with inner tubes of supersize tires comprising a body portion having a restricted portion intermediate its ends to form an upper conical chamber and a lower conical chamber, a freely moving nylon ball within the lower chamber and adapted to cooperate with the restricted portion to form a sealing contact therewith, the said body portion being provided with an outwardly extending flange, a body of cured rubber surrounding the lower portion of said stem and flange, a thimble provided with an extending flange, said thimble having a press fit within the lower part of the said stem thereby compressing rubber between the flange on the said body portion and on the thimble to prevent seepage of fluid along the lower end of the chamber in the valve stem, a tubular member having an end thereof formed with a conical surface of slightly less angle than the conical surface of the upper chamber of the aforesaid body portion, means cooperating with the aforesaid body portion for engaging with a portion of the said tubular member to thereby force a portion of the conical surface of the said extension into line contact with the conical surface in the upper chamber of the aforesaid body portion thereby to provide a sealing relationship.

3. The combination of a valve stem adapted for use with inner tubes of supersize tires comprising a body portion having a restricted portion intermediate its ends to form an upper conical chamber and a lower conical chamber, a freely moving nylon ball within the lower chamber and adapted to cooperate with the restricted portion to form a sealing contact therewith, the said body portion being provided with an outwardly extending flange, a body of cured rubber surrounding the lower portion of said stem and flange, a thimble provided with an extending flange, said thimble having a press fit within the lower part of the said stem thereby compressing rubber between the flange on the said body portion and on the thimble to prevent seepage of fluid along the lower end of the chamber in the valve stem, a tubular member having an end thereof formed with a conical surface of slightly less angle than the conical surface of the upper chamber of the aforesaid body portion, means cooperating with the aforesaid body portion for engaging with a portion of the said tubular member to thereby force a portion of the conical surface of the said extension into line contact with the conical surface in the upper chamber of the aforesaid body portion thereby to provide a sealing relationship, the conical portion of the said tubular member being provided with an extension adapted to extend into the restricted portion of the body portion of the valve stem and unseat the ball valve.

References Cited in the file of this patent

UNITED STATES PATENTS

| | | |
|---|---|---|
| 217,643 | Schmidt | July 15, 1879 |
| 634,752 | Honold | Oct. 10, 1899 |
| 877,720 | Kirchoff | Jan. 28, 1908 |
| 1,348,708 | Garland | Aug. 3, 1920 |
| 1,555,049 | Williams | Sept. 29, 1925 |
| 1,903,395 | Crowley | Apr. 4, 1933 |
| 1,951,460 | Williams | Mar. 20, 1934 |
| 2,106,673 | Broecker | Jan. 25, 1938 |
| 2,330,864 | Bruno | Oct. 5, 1943 |
| 2,450,195 | Grantham | Sept. 28, 1948 |
| 2,482,469 | Crowley | Sept. 20, 1949 |
| 2,600,162 | Frantz | June 10, 1952 |
| 2,676,781 | Hobbs | Apr. 27, 1954 |